United States Patent [19]
Wysocki et al.

[11] 4,418,984
[45] Dec. 6, 1983

[54] MULTIPLY COATED METALLIC CLAD FIBER OPTICAL WAVEGUIDE

[75] Inventors: Joseph A. Wysocki, Oxnard; George R. Blair, Culver City; Michael R. Vince, Pollock Pines, all of Calif.

[73] Assignee: Hughes Aircraft Company, El Segundo, Calif.

[21] Appl. No.: 203,762

[22] Filed: Nov. 3, 1980

[51] Int. Cl.$^3$ .................. G02B 1/10; G02B 5/14; G02B 5/172; C03C 25/04
[52] U.S. Cl. .................. 350/96.33; 65/3.11; 65/3.3; 250/227; 350/96.34; 427/163; 427/383.5
[58] Field of Search .................. 350/96.29, 96.3, 96.33, 350/96.34, 96.1; 250/227; 65/3.1, 3.11, 3.12, 3.13, 3.3, 3.31, 3.2, 4.21; 427/165, 163, 383.5; 428/379, 381, 386, 389

[56] References Cited

U.S. PATENT DOCUMENTS

| | | | |
|---|---|---|---|
| 2,848,390 | 8/1958 | Whitehurst et al. | 65/3.3 |
| 3,019,515 | 2/1962 | Whitehurst et al. | 350/96.29 X |
| 3,434,774 | 3/1969 | Miller | 350/96.33 X |
| 3,778,132 | 12/1973 | Pinnow et al. | 350/96.3 |
| 3,788,827 | 1/1974 | De Luca . | |
| 3,806,224 | 4/1974 | MacChesney et al. | 350/96.3 |
| 4,089,585 | 5/1978 | Slaughter et al. | 350/96.23 |

FOREIGN PATENT DOCUMENTS 858179  6/1977  Belgium .

OTHER PUBLICATIONS

Almeida et al–"On-Line Metal Coating of Optical Fibres", Optic, vol. 53, No. 3, Jun. 1979; pp. 231–233.

*Primary Examiner*—Marvin L. Nussbaum
*Attorney, Agent, or Firm*—J. Dennis Moore; David W. Collins; Anthony W. Karambelas

[57] ABSTRACT

There is disclosed a metallic clad glass fiber optical waveguide suitable for use as a high-strength optical transmission line, e.g., for high capacity communications systems and for sensors operating at high temperature. At least two metallic claddings or coatings are formed on the glass waveguide structure, which comprises a core and glass cladding, by coating the glass fiber with at least one of the metallic coatings as it emerges from the furnace with a metal or alloy. The first metal or alloy employed is one that is substantially chemically inert with respect to the material comprising the glass fiber at the deposition temperature during coating of the metal or alloy onto the glass fiber. The second metallic coating may be of the same composition as the first, in order to repair pinholes or to increase the thickness. Alternatively, the second metallic coating may be of a different composition than the first in order to provide the waveguide with mechanical properties that are different than either layer alone could provide. Specific electrical and magnetic properties may also be provided. The metallic coatings prevent chemical or mechanical damage to the glass surface. A plastic coating is optionally provided for additional protection of the metallic surface.

35 Claims, 1 Drawing Figure

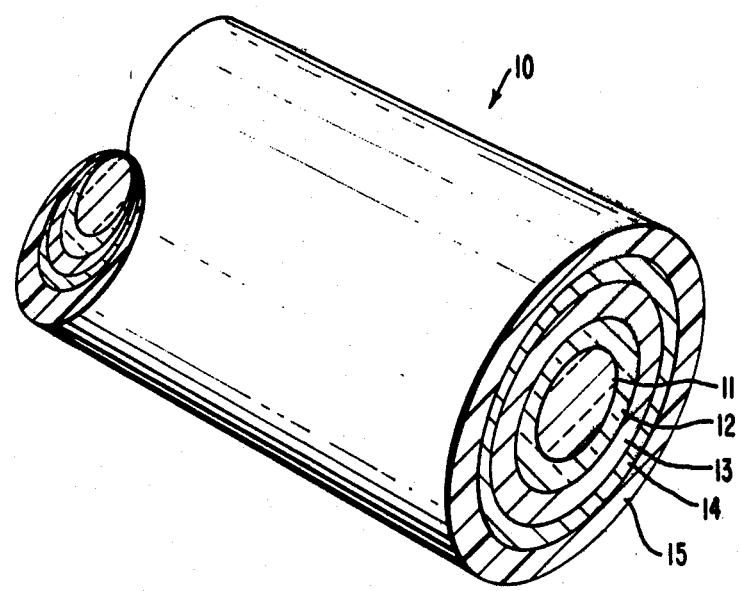

MULTIPLY COATED METALLIC CLAD FIBER OPTICAL WAVEGUIDE

CROSS-REFERENCE TO RELATED APPLICATION

This patent application is related to Ser. No. 196,955, filed Oct. 14, 1980, which discloses and claims metallic clad optical waveguides employing a metal or alloy coating that does not react with the silica comprising the waveguide.

BACKGROUND OF THE INVENTION

1. Field of the Invention

This invention relates to fiber optical waveguides comprising a silica cladding surrounding a core, and, in particular, to multiply coated metallic clad optical waveguides employing as a first metallic cladding on the silica cladding a metal or alloy coating that does not react with the silica.

2. Description of the Prior Art

The current state-of-the-art of doped silica fiber optical waveguides has progressed to the point where low loss (below 5 dB/km) is becoming routine and the major technical uncertainty which may yet determine the success or failure of this emerging technology relates to packaging of the fiber into a cable structure that will protect the silica from hostile elements that can cause it to break. The fragility of glass fibers is well-known and it is the main reason why some early exploratory systems used bundles of silca fibers rather than single strands in their optical data links.

For many applications, the solution to the problem requires the strengthening of the individual fibers. When long-length (1 km or greater), high-tensile strength fibers are available, communication and data links can be made with light weight single strand fibers rather than heavily armored cables or with bundles.

Optical waveguides of the type discussed above are described in greater detail in U.S. Pat. Nos. 3,434,774, 3,778,132, 3,788,827 and 3,806,224. A considerable effort has been expended on coating such fiber optical waveguides with organic materials such as thermoplastics and ultraviolet-cured polymers. These materials are satisfactory for a short time, but they do not form a hermetic seal. Eventually, they will pass contaminants such as moisture which will attack the glass surface and weaken the fiber.

Metal coated glass fibers for optical waveguides have been disclosed; see, e.g., U.S. Pat. Nos. 3,778,132, 3,788,827 and 4,089,585 and Belgian Pat. No. 858,179. However, problems are often encountered employing single metallic coatings on optical fibers. Either pin holes in the coating are obtained during deposition of the metal coating on the optical fiber or, as set forth in the above-mentioned patent application Ser. No. 196,955, filed Oct. 14, 1980 many metals and alloys react with the silica, causing a degradation of strength over the long term.

SUMMARY OF THE INVENTION

In accordance with the invention, a glass fiber optical waveguide is provided with at least two metallic claddings, with (a) a first metallic cladding in contact with the glass fiber, the first metallic cladding comprising a metal or alloy which is substantially chemically inert with respect to the material comprising the glass fiber at the deposition temperature during coating of the metal or alloy onto the glass fiber and (b) at least one additional metallic cladding over the first metallic cladding. The inventive structure is suitable for use in flexible glass fiber waveguides for the transmission of optical electromagnetic energy. The optical waveguide includes a glass core member having a first minimum refractive index for the optical radiation and a glass cladding concentrically surrounding the core, the glass cladding including at least one layer having a second refractive index for the radiation which is lower than the minimum of the first refractive index by at least 0.1% to produce internal reflection of the optical radiation at the core/clad interface and to thereby guide the optical radiation along the waveguide.

Advantageously, localized defects (such as pin hole openings) in the first metallic cladding or coating are repaired by at least one additional metallic coating. Further, the thickness of the first metallic coating may be increased by employing a second (or more) layer. Both of these improvements may be accomplished by coating the glass fiber at least twice with the same metal or alloy. Advantageously, the coating conditions for subsequent metallic coatings are not subject to constraints imposed by the glass fiber drawing conditions. Consequently, subsequent metallic coatings may be of different composition than the first. In this case, the subsequent metal or alloy may have distinctly different physical properties than the first metal or alloy. Further, a subsequent heat treatment may be used to form an alloy with physical properties not inherent to any of the metal or alloy coatings such that an optimum combination of mechanical and optical properties is preserved in the waveguide.

BRIEF DESCRIPTION OF THE DRAWING

The FIGURE is a perspective view, partly in section, showing on an enlarged scale the details of the multiply coated metallic clad fiber optical waveguide of the invention.

DETAILED DESCRIPTION OF THE INVENTION

There is shown in the FIGURE (not to scale) a multiply coated metallic clad fiber optical waveguide 10 in accordance with the invention. The waveguide is of indeterminate length. Waveguide 10 comprises a central core 11, a glass cladding 12 concentrically surrounding the core 11, a first metallic cladding or coating 13 concentrically surrounding the glass cladding 12 and a second metallic cladding or coating 14 concentrically surrounding the first metallic coating 13. Core portion 11 is preferably high-purity $SiO_2$ or doped silica having a first index of refraction, $n_1$. The guiding or cladding portion 12 may be of $SiO_2$ or any suitable glass material having a slightly lower index of refraction, $n_2$. The core 11 may have a uniform index of refraction or it may comprise two or more layers, with each successive layer being of lower index than that underlying so as to approximate the parabolic gradient of particular utility in multi-mode structures. Cladding 12 is usually of uniform composition but may also be of graded composition. The second index of refraction is generally at least about 0.1% less than the first index of refraction in order to produce total internal reflection of optical radiation at the core/clad interface and thereby guide the optical radiation along the waveguide. For multi-mode fibers, $n_2$ is usually about 1% less than $n_1$.

The first metallic cladding 13 comprises a metal or alloy that is substantially chemically inert with respect to the glass fiber, more particularly, with respect to the cladding portion 12. That is, the metal or alloy is one that does not react chemically with the glassy material at the deposition temperature during the time of coating the metal or alloy onto the glass fiber. The first metallic coating, as more fully described below, is preferably applied by passing the fiber through a molten pool of the metal or alloy. In view of the velocity with which a fiber passes through a molten pool of the metal or alloy being coated on the fiber (about 1 to 10 ft/sec, usually about 3 ft/sec) the melting point of the metal or alloy may be higher than the softening point of $SiO_2$. In particular, the melting point of the metal or alloy to be coated may range as high as about 2,300° C. so long as the fiber itself does not experience a temperature greater than its softening point.

In determining whether a particular metal or alloy is stable under the conditions above, a comparison of the free energy of formation of the corresponding oxide at the deposition temperature of the metal or alloy with the free energy of formation of silica at the same temperature is necessary. The free energy of formation of an oxide of the metal or alloy must be less negative than the free energy of formation of silica at the deposition temperature; otherwise, such metal or alloy may have a higher affinity for oxygen than silicon and thus would react with $SiO_2$. However, if the kinetics of oxide formation are sufficiently sluggish, use of metals and alloys having a free energy of formation of the corresponding oxide somewhat more negative than the free energy of formation of silica may be employed. Metal elements suitable for the first metallic cladding layer include vanadium, chromium, manganese, iron, cobalt, nickel, copper, arsenic, strontium, zirconium, niobium, rhodium, palladium, tellurium, barium, iridium, platinum, thallium, tin, lead, zinc and cadmium. Alloys suitable as first metallic cladding include alloys containing these elements in combination with each other or in combination with other elements, whether metallic or non-metallic, so long as the alloys remain ductile at ordinary temperatures of use, whether at room temperature or some elevated temperature. Examples of such other alloying metal elements include aluminum and magnesium, while examples of such other alloying non-metal elements include antimony, bismuth, boron, carbon, phosphorus and silicon. Due to factors related to toxicity, expense, ease of handling and other factors, elements such as manganese, arsenic, strontium, rhodium, tellurium, barium, iridium, platinum and thallium, which are otherwise suitable, are not likely to find use except as alloying elements and hence are not preferred as elemental metal coatings.

The second (and subsequent) metallic cladding may be any metal or alloy and is not subject to the same constraints as the first metallic cladding, except that if the first metallic cladding has a recrystallization temperature less than room temperature or the anticipated use temperature of the fiber, whichever is greater, then the second metallic cladding must comprise a metal or alloy having a recrystallization temperature greater than room temperature or the anticipated use temperature, whichever is greater. Tin, lead, zinc and cadmium are examples of metals having a recrystallization temperature less than room temperature. In such a case, the first metallic cladding acts as a buffer, while the second metallic cladding mechanically constrains the first metallic cladding.

The second (and subsequent) metallic cladding may comprise substantially the same composition as the first in order to cure localized defects or to build up the thickness. Alternatively, the second (and subsequent) metallic cladding may be of a different metal or alloy which otherwise might or might not react with the underlying glass fiber. Accordingly, a hybrid structure may be fabricated having mechanical properties that are better than either metallic cladding alone. For example, the first metallic cladding may comprise tin which does not react with silica and the second metallic cladding may comprise aluminum. Another combination is a steel (high yield point) on tin (low yield point); this combination will not significantly increase attenuation as a result of micro-blending because of the mechanical properties of the combination. Additional combinations include tin on copper, tungsten on tin, copper on tin, copper on zinc, tin on nickel and aluminum on copper.

Additional metallic cladding layers may also be formed as desired on the second metallic cladding. For example, tin may be deposited on copper and alloyed, as described below, to form a brass for specific mechanical properties, with nickel or iron subsequently deposited on the metalli coating for magnetic applications.

The metallic coatings are applied to provide the glass fiber optical waveguide with properties not available to unclad waveguides. For example, the metallic coatings may provide a hermetic seal around the glass fiber. Additionally, the mechanical, electrical and magnetic properties may be tailored for specific applications. In particular, at least one of the metallic coatings or a composite formed by at least partially alloying at least two metallic coatings, as described below, is ferromagnetic at the contemplated use temperature. An example of a two-layer metallic cladding is nickel, which is ferromagnetic up to about 358° C., on tin.

The metallic claddings may be applied by a variety of methods, including the passage of the fiber through a molten pool, as described below, vapor plating, vacuum deposition, sputtering, electro-deposition and the like. In any event, the metallic coating is applied to the glass fiber during the drawing operation immediately after the fiber emerges from the furnace, employing apparatus well-known for coating glass fibers with metals. Importantly, the metallic coating is applied before the fiber has a chance to be abraded by the take-up drum onto which the coated fiber is spooled and even before the fiber cools to the point where ambient moisture can react with its surface.

Preferably, at least one of the metallic layers, most preferably the first, is applied by passing the glass fiber through a coating cup which contains the molten metal or alloy to be coated onto the fiber at a temperature slightly above the melting point of the metal or alloy. The cup has a small hole in its bottom large enough to pass the glass fiber but sufficiently small so that surface tension of the molten metal or alloy prevents it from running out. As the glass fiber passes through the cup, a thin layer of metal or alloy freezes onto the surface of the glass fiber. This method rapidly forms thick metallic coatings having characteristics similar to those of the bulk metal or alloy.

Proper conditions for the formation of a strong, adherent metallic layer on the glass fiber surface require that the temperature of the metal-containing bath through which the glass fiber is passed be slightly greater than the melting point of the metal or alloy, while the temperature of the glass fiber be somewhat below this melting point. Further, in the case of alloys, the alloys must evidence solubility in the liquid state in order to avoid segregation of phases in these alloys during cooling.

The thickness of the metallic layers is controlled by adjusting the fiber drawing rate and the metal deposition parameters such as, for example, in the case of molten metal coating, the temperature differential between the fiber and the metal-containing bath. Typically, the thickness of the first metallic cladding lies in the range from about 10 to 50 μm and preferably lies in a range of about 15 to 20 μm. The maximum thickness is restricted by a requirement to not impair the flexibility of the fiber and otherwise interfere with optical properties, whereas the minimum thickness is set by a requirement to achieve adequate strength and hermetic sealing. The total thickness of the second metallic cladding and subsequent metallic claddings ranges from about 1 to 200 μm. Thicknesses as low as about 1 μm are suitable for establishing suitably different properties from the first metallic cladding (e.g., passivation, anodization, etc.), while thicker coatings (about 25 to 200 μm) may represent completely different structures (e.g., Al over Sn for improved electrical conductivity).

In the glass fibers employed in the invention, it is necessary to maintain the radial thickness of the glass-cladding layer 12 in the range of about 10 to 250 μm and preferably in the range of about 10 to 50 μm. The radius of core 11 should lie in a range from about 5 μm for single mode fibers to about 200 μm for multi-mode fibers. For the commonly used multi-mode fibers, the preferred range for the radius of the core is about 25 to 45 μm. This preferred range arises from a trade-off between the ease of fiber splicing, which favors large cores, and the expense of the ultra-high purity core material, which favors small cores. The total diameter of the waveguide 10 should, however, be less than about 500 μm.

The resulting glass fiber optical waveguide 10 evidences a retention of mechanical strength of the nascent glass fiber to a greater extent than evidenced by other metallic and non-metallic clad fiber optical waveguides. Further, the waveguide of the invention will not fail due to static fatique if it is used at less than about ¾ of its original tensile strength, regardless of the absolute value of that tensile strength.

Following formation of at least two metallic coatings, the coated fiber may be subjected to a heat treatment, either immediately following deposition of the metallic layers or at some subsequent time after take-up. The heating may be done to form a stronger mechanical bond and/or chemical bond between the layers or, in the case of metals such as copper on tin, the heating may be done to form an alloy which otherwise could not be deposited from the molten state due to the existence, as in the case of Cu-Sn alloys, of a wide range of liquids/solidus temperatures such that deposition from the melt requiring uniform freezing may not be possible. In any event, the heating is done under sufficient time and temperature conditions to at least partially alloy the metallic coatings.

The combination of metallic layers 13 and 14 provides good mechanical protection and a hermetic seal against contamination. Additional mechanical protection, galvanic protection and electrical insulation can be achieved as needed by applying a plastic overcoat 15 on the outermost metallic jacket 14. For example, as little as 10 to 25 μm of a polyvinyl formate coating is useful in preserving the integrity of the metallic cladding in an electrolytic cell with stainless steel electrodes and salt water. Other plastic coatings may also be used.

It is now known that the influence of the effect of a metallic boundary layer on a doped silica waveguide comprising core member 11 and glass cladding 12 on the optical attenuation is negligible if the cladding glass thickness is greater than about 10 μm. Since the glass claddings on most of the present low-loss waveguides are actually in the range of at least about 25 μm, the metallic layer does not impose any new constraints on the waveguide size.

The waveguides of the invention are capable of operating continuously for at least a year at a temperature up to about ⅔ $T_m$ (°K.), where $T_m$ is the melting point of the metal or alloy, with no more than about 100% damage (i.e., no more than about 50% loss of strength). The metals and alloys that are suitable for use at elevated temperatures include those discussed above which also have a melting point at least 50% greater than the contemplated working temperature. Such metallic clad optical fibers are used, e.g., in oil well probes (200° C.), as liquid level sensors in nuclear reactors (350° C.) and for monitoring blade temperature in turbine blades (1,000° C.).

EXAMPLE

A glass fiber comprising a core of germania-phosphoria-silica having a radius of 55 μm and a cladding of silica having a thickness of 60 μm was passed through a molten pool of Sn maintained at 242° C. The fiber was drawn through the molten pool as the fiber emerged from the furnace; the drawing rate was about 3 ft/sec. A coating of about 25 μm of Sn was deposited on the fiber. The coated fiber was spooled onto a drum. Subsequently, an off-line electro-deposition of Ni was performed, depositing a coating of about 35 μm of Ni onto the Sn.

What is claimed is:

1. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said waveguide is provided with at least two metallic claddings with a first metallic cladding in contact with said glass fiber, said first metallic cladding comprising a metal or alloy which is substantially chemically inert with respect to the material comprising the glass fiber at the deposition temperature during coating of said metal or alloy onto said glass fiber, and at least one of said metallic claddings comprising a metal or alloy having a recrystallization temperature greater than room temperature or the anticipated use temperature, whichever is greater.

2. The waveguide of claim 1 in which said first metallic cladding comprises an element selected from the group consisting of vanadium, chromium, iron, cobalt, nickel, copper, zirconium, niobium, palladium, tin, lead, zinc and cadmium.

3. The waveguide of claim 2 in which said first metallic cladding comprises an element selected from the group consisting of iron, cobalt, nickel and copper.

4. The waveguide of claim 2 comprising at least two metallic claddings, said first metallic cladding comprising an element selected from the group consisting of tin, lead, zinc and cadmium and a second metallic cladding comprising a metal or alloy having a recrystallization temperature greater than room temperature or the anticipated working temperature, whichever is greater.

5. The waveguide of claim 1 in which a major portion of said first metallic cladding comprises at least one element selected from the group consisting of vanadium, chromium, iron, cobalt, nickel, copper, zirconium, niobium, palladium, tin, lead, zinc and cadmium.

6. The waveguide of claim 1 in which said first metallic cladding comprises an alloy which evidences continuous solubility in the liquid state.

7. The waveguide of claim 1 comprising two metallic claddings.

8. The waveguide of claim 7 in which both metallic claddings are of substantially the same composition.

9. The waveguide of claim 7 in which both metallic claddings are of different composition.

10. The waveguide of claim 1 in which at least one of said metallic claddings is ferromagnetic at the contemplated use temperature.

11. The waveguide of claim 1 which additionally comprises a plastic coating formed on the outside of said at least two metallic claddings.

12. A process for forming a fiber optical waveguide employed in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said process includes forming at least two metallic claddings on said glass fiber, with a first metallic cladding comprising a metal or alloy that is substantially chemically inert with respect to the material comprising said glass fiber at the deposition temperature during coating of said metal or alloy onto said glass fiber, and with at least one of said metallic claddings comprising a metal or alloy having a recrystallization temperature greater than room temperature or the anticipated use temperature, whichever is greater.

13. The process of claim 12 in which said first metallic cladding comprises an element selected from the group consisting of vanadium, chromium, iron, cobalt, nickel, copper, zirconium, niobium, palladium, tin, lead, zinc and cadmium.

14. The process of claim 13 in which said first metallic cladding comprises an element selected from the group consisting of iron, cobalt, nickel and copper.

15. The process of claim 13 comprising forming at least two metallic claddings, said first metallic cladding comprising an element selected from the group consisting of tin, lead, zinc and cadmium and a second metallic cladding comprising a metal or alloy having a recrystallization temperature greater than room temperature or the anticipated working temperature, whichever is greater.

16. The process of claim 12 in which a major portion of said first metallic cladding comprises at least one element selected from the group consisting of vanadium, chromium, iron, cobalt, nickel, copper, zirconium, niobium and palladium.

17. The process of claim 12 in which said first metallic cladding comprises an alloy which evidences continuous solubility in the liquid state.

18. The process of claim 12 in which said glass fiber is coated with at least one of said metallic claddings by passage of said glass fiber through a molten pool of said metal or alloy following drawing of said glass fiber.

19. The process of claim 18 in which said glass fiber is coated with at least said first metallic cladding by passage of said glass fiber through said molten pool.

20. The process of claim 12 comprising forming two metallic claddings.

21. The process of claim 20 comprising forming two metallic claddings having substantially the same composition.

22. The process of claim 20 comprising forming two metallic claddings having different compositions.

23. The process of claim 12 which comprises forming a ferromagnetic layer in at least a portion of said at least two metallic claddings.

24. The process of claim 12 further comprising forming a plastic coating on the outermost coating of said at least two metallic claddings.

25. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal reflection of said optical radiation at the core/clad interface and to thereby guide said optical radiation along said waveguide, characterized in that said waveguide is provided with at least two metallic claddings at least partially alloyed, with a first metallic cladding in contact with said glass fiber, said first metallic cladding comprising a metal or alloy which is substantially chemically inert with respect to the material comprising the glass fiber at the deposition temperature during coating of said metal or alloy onto said glass fiber.

26. The waveguide of claim 25 in which said at least partially alloyed metallic claddings form an alloy which is ferromagnetic at the contemplated use temperature.

27. A process for forming a fiber optical waveguide employed in the transmission of optical electromagnetic radiation, said waveguide comprising a glass fiber including a glass core member having a first minimum refractive index for said radiation and a glass cladding concentrically surounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said process comprises the steps of:

(a) forming at least two metallic claddings on said glass fiber, with a first metallic cladding comprising a metal or alloy that is substantially chemically inert with respect to the material comprising said glass fiber at the deposition temperature during coating of said metal or alloy onto said glass fiber; and (b) heating said metallic clad glass fiber under conditions sufficient to at least partially alloy said at least two metallic claddings.

28. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said waveguide is provided with at least two metallic claddings, with a first metallic cladding in contact with said glass fiber, said first metallic cladding comprising an alloy which is substantially chemically inert with respect to the material comprising the glass fiber at the deposition temperature during coating of said alloy onto said glass fiber, said alloy comprising at least one element selected from the group consisting of vanadium, chromium, iron, cobalt, nickel, copper zirconium, niobium, palladium, tin, lead, zinc and cadmium, and at least one additional element selected from the group consisting of manganese, arsenic, strontium, rhodium, tellurium, barium, iridium, platinum, thallium, aluminum, magnesium, antimony, bismuth, boron, carbon, phosphorus and silicon.

29. The waveguide of claim 28 in which said additional element is at least one selected from the group consisting of manganese, arsenic, aluminum, magnesium, antimony, boron, carbon, phosphorus and silicon.

30. A flexible fiber optical waveguide for the transmission of optical electromagnetic radiation, said waeguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said waveguide is provided with at least two metallic claddings, with a first metallic cladding in contact with said glass fiber, said first metallic cladding comprising a metal or alloy which is substantially chemicaly inert with respect to the material comprising the glass fiber at the deposition temperature during coating of said metal or alloy onto said glass fiber, and wherein said first metallic cladding comprises tin, coated with a second metallic cladding comprising nickel.

31. A flexible fiber optical waveguide for the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said waveguide is provided with at least two metalic claddings, with a first metallic cladding in contact with said glass fiber, said first metallic cladding comprising a metal or alloy which is substantially chemically inert with respect to the material comprising the glass fiber at the deposition temperature during coating of said metal or alloy onto said glass fiber, wherein the thickness of said first metallic cladding ranges from about 10 to 50 $\mu$m and the total thickness of subsequent metallic claddingss ranges from about 1 to 200 $\mu$m.

32. A process for forming a fiber optical waveguide employed in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at leat 0.1% to produce total internal refraction of said optical radiation at the core/clad interface and to thereby guide said optical radiation along said waveguide, characterized in that said process includes forming at least two metallic claddings on said glass fiber, with a first metallic cladding comprising an alloy that is substantially chemically inert with respect to the material comprising said glass fiber at the deposition temperature during coating of said alloy onto said glass fiber, wherein a major portion of said alloy comprises at least one element selected from the group consisting of vanadium, chromium, iron, cobalt, nickel, copper, zirconium, niobium and palladium, and at least one additional element selected from the group consisting of manganese, arsenic, strontium, rhodium, tellurium, barium, iridium, platinum, thallium, aluminum, magnesium, antimony, bismuth, boron, carbon, phosphorus and silicon.

33. The process of claim 32 in which said additional element is at least one selected from the group consisting of manganese, arsenic, aluminum, magnesium, antimony, boron, carbon, phosphorus and silicon.

34. A process forming a fiber optical waveguide employed in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said process includes forming at least two metallic claddings on said glass fiber, with a first metallic cladding comprising a metal or alloy that is substantially chemically inert with respect to the material comprising said glass fiber at the deposition temperature during coating of said glass fiber at the deposition temperature during coating of said metal or alloy onto said glass fiber, wherein said first metallic cladding is formed to a thickness ranging from about 10 to 50 $\mu$m and subsequent metallic claddings are formed to a total thickness ranging from 1 to 200 $\mu$m.

35. A process for forming a fiber optical waveguide employing in the transmission of optical electromagnetic radiation, said waveguide comprising a glass fiber including a glass core member having a first minimum refractive index for said radiation and a glass cladding concentrically surrounding said core, said glass cladding including at least one layer having a second refractive index for said radiation which is lower than the minimum of said first refractive index by at least 0.1% to produce total internal refraction of said optical radiation at the core/clad interface and to thereby guide said optical radiation along said waveguide, characterized in that said proces includes forming at least two metallic claddings on said glass fiber, with a first metallic cladding comprising tin and a second metallic cladding of nickel thereon.

* * * * *